OR 4,002,922

United States Patent [19]

Young

[11] 4,002,922
[45] Jan. 11, 1977

[54] VACUUM ULTRAVIOLET CONTINUUM LAMPS

[76] Inventor: Robert A. Young, R.R. No. 2, Loretto, Canada

[22] Filed: June 12, 1975

[21] Appl. No.: 586,273

[52] U.S. Cl. .............................. 307/88.3; 313/224; 313/220; 313/174; 313/184; 313/185; 313/186; 313/187; 315/248

[51] Int. Cl.² .......................................... H03F 7/04

[58] Field of Search .......... 307/88.3; 313/224, 226, 313/220, 186–187; 315/248, 267, 344

[56] References Cited

UNITED STATES PATENTS

| 3,801,797 | 4/1974 | Harris et al. ....................... 307/88.3 |
| 3,851,214 | 11/1974 | Young ............................. 313/220 X |

Primary Examiner—Palmer C. Demeo
Assistant Examiner—Darwin R. Hostetter
Attorney, Agent, or Firm—Harris, Kern, Wallen & Tinsley

[57] ABSTRACT

A conversion device for converting a resonance photon into a photon characteristic of a molecule whose lowest state is not stable, comprising a resonance lamp emitting light characteristic of a first gas and a conversion cell filled with said first gas and a rare gas. The mixture in said conversion device is illuminated by the resonance radiation characteristic of the first gas by the resonance lamp so as to produce the excited gas atom of said first gas in said conversion device, on which then forms a molecule by association with either first or second species.

14 Claims, 2 Drawing Figures

VACUUM ULTRAVIOLET CONTINUUM LAMPS

This invention relates generally to a radiation conversion device, and more specifically to a device for converting the resonance radiation emitted by a vacuum ultraviolet resonance lamp into radiation characteristic of an excited molecule for emission of continuum radiation.

Sources of rare gas diatomic molecular continuum exist and have long been used as background sources for the measurement of absorption spectra of other species in the vacuum ultraviolet. These sources all use a discharge in a high power microwave generator or a high voltage capacitive discharge. None of these devices employ formation of the rare gas molecule in a separate conversion device.

Accordingly, it is an object of this invention to provide a conversion device which employs a resonance photon source with formation of the excited gas molecule in a separate conversion device.

A further object of this invention is to provide a conversion device wherein a gas atom is excited by a resonance lamp photon and forms a molecule from which is emitted a continuum of radiation.

Figure 1:
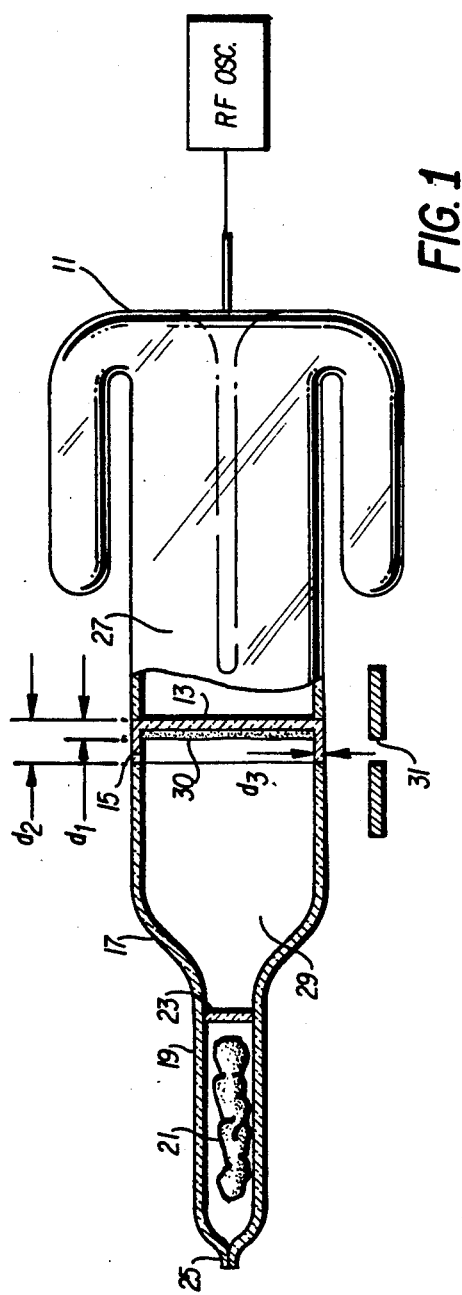
Figure 2:
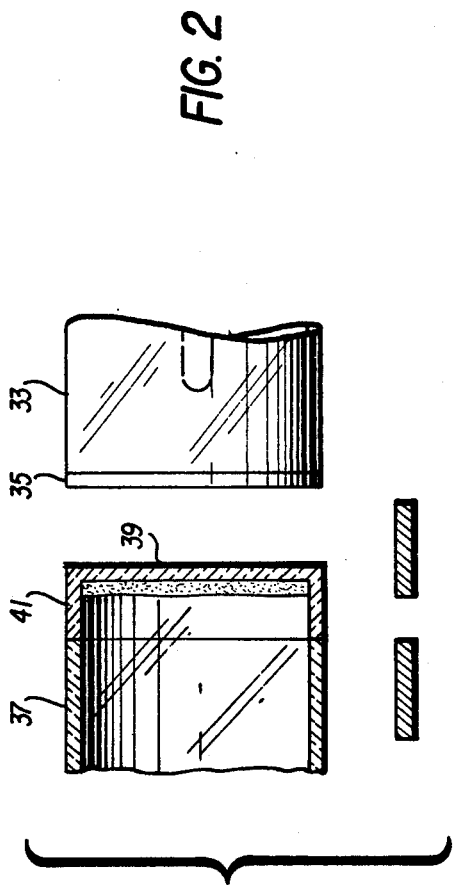

These and other objects of the invention will become apparent from the following description taken together with the drawings wherein:

FIG. 1 is a schematic representation of a preferred embodiment of the present invention; and FIG. 2 is a schematic representation of a modification of the present invention.

Broadly speaking, the present invention relates to a conversion device for converting a resonance photon into a photon characteristic of a molecule whose lowest state is not stable, comprising a resonance lamp emitting light characteristic of a first gas and a conversion cell filled with said first gas and a rare gas. The mixture in said conversion device is illuminated by the resonance radiation characteristic of the first gas by the resonance lamp so as to produce the excited gas atom of said first gas in said conversion device, on which then forms a molecule by association with either first or second species.

Turning now more specifically to FIG. 1 there is shown a schematic diagram of a preferred embodiment of the present invention. This invention uses a low power resonance lamp 11 which may have a controllable chemical decomposition source of a parent species and has a chemical getter sink in a sealed envelope. A RF discharge occurs in a second, extremely pure rare gas which is present in great excess over the gas produced by chemical decomposition. Excitation of species whose emission is desired occurs by electron impact or energy transfer from the major species which are, in turn, excited by the electron impact.

This lamp is described in detail in U.S. Pat. No. 3,851,214, issued in the name of the present inventor and in U.S. Pat. application Ser. No. 488,184 entitled Helium Resonance Lamp and a Leak Detection System Using the Lamp, filed July 12, 1974 in the name of the present inventor, now U.S. Pat. No. 3,904,907. This patent and patent application are hereby incorporated by reference in this description.

The lamp 11 used in this invention as shown in the preferred embodiment of FIG. 1 is the same as that described in the above identified application with the exception that it is provided with a window 13 having a lip 15 which extends outwardly about the periphery of the window 13. Preferably, the dimension $d_1$ which is the thickness of the window is substantially the same as the extension of the lip 15 and the thickness $d_3$ of the lip is substantially the same as $d_1$.

A conversion cell 17 is secured to the lip 15 so that window 13 also acts as a window for the conversion cell. The conversion cell has a reduced section 19 in which there is placed a getter 21. The getter is separated from the main body of the conversion unit 17 by means of a barrier 23 such as glass frit or the like. The conversion cell 17 terminates at a closed end 25. There is also shown schematically a spectrometer slit 31 which will be discussed as the description proceeds.

A third gas, if this is needed, may be produced by the thermal decomposition of a suitable compound as discussed in U.S. Pat. No. 3,851,214 and patent application Ser. No. 488,184, entitled Helium Resonance Lamp and a Leak Detection System Using the Lamp, filed July 12, 1974 in the name of the present inventor. Under some circumstances, the source may not be required, because no third gas is used or because it is mixed with $R_1$ and $R_2$ in the initial filling of the conversion device.

As an example of the operation of the conversion device, the interior of the resonance lamp 11 is filled with a rare gas $R_1$, while the interior 29 of the conversion cell 17 is filled with a similar rare gas, $R_1$, and a second are gas $R_2$. Thus, the conversion device contains a mixture of the two are gases $R_1$ and $R_2$, and these gases are illuminated by resonance radiation characteristic of rare gas $R_1$ by the resonance lamp 11. This resonance radiation is strongly absorbed in a thin sheet 30 in the conversion device 17 by rare gas $R_1$. Rare gas $R_2$ collisionally deactivates the resonance of $R_1$, resulting from resonance absorption, $R^*$, into its slightly low energy metastable state $R^{**}$. Then the following reaction occurs:

$$R_1 + R_1^{**} + R_2 \rightarrow (R_1 R_1)^* + R_2$$

$$(R_1 R_1)^* \rightarrow R_1 + R_1 + h\gamma$$

where $(R_1 R_1)^*$ is an excited rare gas molecule which emits continuum radiation, $h\gamma$, because its lower state is unstable (repulsive). Referring to FIG. 1, the resonance lamp 11 has a window of an appropriate transparent material such as lithium fluoride or magnesium fluoride. In the particular embodiment shown in FIG. 1 lip 15 may be formed by grinding a depression in a window having a thickness $d_2$. A preferable invention would be that each of $d_1$ and $d_3$ is one millimeter thick with a two millimeter dimension for $d_2$.

Upon operation of the resonance lamp 11 which is filled with rare gas $R_1$, emission characteristic of the diatomic excited molecule $(R_1 R_1)^*$ are formed from $R^{**}$. A metastable state of $R_1$, and an excited rare gas atom $R_2$ is necessary only to convert $R_1^*$, resonantly exicted $R_1$, to its metstable state $R_1^{**}$ and to assist its combination with $R_1$ to form $(R_1 R_1)^*$. This reaction results in an emission of continuum radiation through the lip 15. This radiation may be used in a device such as a spectrometer (not shown) through a spectrometer slit 31, the length of which is parallel to the lamp window 13 so that continuum emission passes through lip 15 into the spectrometer.

Examples of the rare gases which may be used are as follows:

1. $R_2$ is helium and $R_1$ is argon, krypton or xenon
2. $R_2$ is helium, $R_1$ is argon, krypton or xenon and $R_3$ is argon, krypton or xenon It is not necessary that $R_2$ or $R_3$ be rare gases, for example, if $R_2$ is xenon, when $R_3$ could be Cl or O which form (XeCl)* or (XeO)* with Xe and emit a continuum radiation since the ground stage of these molecules is dissociative. Similarly, the properties of $R_2$ and $R_3$ may be interchanged, i.e. $R_2$ could be Cl if a resonance Cl lamp is used, when (ClXe) could be formed from Cl**. In those instances $Cl_2$ or $O_2$ would be continuously added to the gas mixture of $R_1$ and $R_2$ by decomposition of material in the source arm which is continuously removed by the getter.

The getter may be uranium, pure barium metal, or a barium containing compound.

It is preferably that the gases in the conversion cell be maintained such that $R_1$ has a partial pressure between 1 and 10 torr and $R_2$ has a pressure between 100 and 10,000 torr.

It is to be understood that the shape of both the lamp and the conversion cell, taken in cross section, may assume any conic or polygonal shape.

FIG. 2 shows schematic representation of the modifications of the present invention wherein the resonance lamp 33 has its own separate window 35 and a conversion cell 37 has its own window 39 and associated lip 41. Although these two windows are shown separated, they may in fact be placed adjacent to each other. If separated, the intervening space between the two windows must be transparent to radiation from the resonance lamp.

It is to be understood that the above description and drawings are illustrative only since various components could be used in the schematic illustration without departing from the invention. Accordingly, the scope of the invention is to be limited only by the following claims.

What is claimed is:

1. A conversion device for converting a gas resonance photon into a photon characteristic of a gas molecule comprising in combination:
    a resonance lamp filled with a first gas and providing resonance radiation at a first frequency characteristic of said first gas;
    a window in said resonance lamp having a lip extending outwardly about its periphery;
    a conversion cell, one wall of which is said window;
    a mixture of said first gas at at least one other gas filling said conversion cell, with radiation from said lamp directed through said window into said cell forming molecules of said first gas,
    which molecules decompose into atoms emitting continuum radiation at frequencies lower than said first frequency; and
    a getter within said conversion cell.

2. The conversion device of claim 1 wherein said first gas has a partial pressure between 0.1 and 10 torr and said other gas has a partial pressure between 100 and 10,000 torr.

3. The conversion device of claim 1 wherein the first said gas has a partial pressure between 0.1 and 10 torr, said other gas comprises a second gas having a pressure between 100 and 10,000 torr and a third gas having a pressure between 0.1 and 10 torr.

4. The conversion device of claim 2 wherein said window is lithium fluoride.

5. The conversion device of claim 2 wherein said window is magnesium fluoride.

6. The conversion device of claim 2 wherein said lip extends outwardly substantially the same distance as the thickness of said window.

7. A conversion device for converting a gas resonance photon into a photon characteristic of a molecule containing a gas atom comprising in combination:
    a resonance lamp filled with a first gas and providing resonance radiation at a first frequency characteristic of said first gas;
    a window in said resonance lamp;
    a conversion cell filled with said first gas and a second gas;
    a window in said conversion cell facing said window in said resonance lamp;
    said window in said conversion cell having an inwardly extending lip about its periphery, with radiation from said lamp directed through said windows into said cell forming molecules of said first gas,
    which molecules decompose into atoms emitting continuum radiation at frequencies lower than said first frequency; and
    a getter within said conversion cell.

8. The conversion device of claim 7 wherein said first gas has a partial pressure between 0.1 and 10 torr and said second gas has a pressure between 100 and 1000 torr.

9. The conversion device of claim 7 wherein said first gas has a partial pressure between 0.1 and 10 torr, said second gas has a partial pressure between 100 and 1000 torr, and further comprising
    a thermal decomposition source of a third gas, said third gas having a pressure between 0.1 and 10 torr.

10. A conversion device for converting a gas resonance photon into a photon characteristic of a gas diatomic molecule comprising in combination:
    a conversion cell containing two gases;
    a resonance lamp filled with one of said gases and providing resonance radiation at a first frequency characteristic of said one gas;
    means for illuminating said two gases in said conversion cell by the resonance radiation characteristic of said gas in said resonance cell so as to excite said one of said gases in said conversion cell producing molecules of said one gas which molecules decompose into gas atoms emitting continuum radiation at frequencies lower than said first frequency.

11. A method of producing continuum radiation including the steps of:
    generating resonance photons of a first gas at a first frequency; and
    directing said resonance photons into a mixture of said first gas and at least one other gas producing molecules of said first gas by collisional energy transfer, which molecules decompose into atoms emitting continuum radiation at frequencies lower than said first frequency.

12. The method of claim 11 including adding a third gas to said first and one other gas.

13. The method of claim 11 including maintaining said first gas at a partial pressure between 0.1 and 10 torr and said one other gas at a partial pressure between 100 and 1,000 torr.

14. The method of claim 1 including maintaining said first gas at a partial pressure between 0.1 and 10 torr, and providing second and third gases, maintaining said second gas at a pressure between 100 and 10,000 torr and said third gas at a pressure between 0.1 and 10 torr.

* * * * *

UNITED STATES PATENT AND TRADEMARK OFFICE
CERTIFICATE OF CORRECTION

PATENT NO. : 4,002,922
DATED : January 11, 1977
INVENTOR(S) : Robert A. Young

It is certified that error appears in the above-identified patent and that said Letters Patent are hereby corrected as shown below:

Column 2, Line 29, correct "are" to -- rare --

Column 2, Line 30, correct "are" to -- rare --

Column 2, Line 35, after "resonance", insert -- state --

Column 2, Line 57, correct "excited" to -- unexcited --

Column 3, Line 7, correct "stage" to -- state --

Column 3, Line 17, correct "preferably" to -- preferable --

Column 3, Line 49, delete first appearance of [at] and correct to -- and --

Signed and Sealed this

Twenty-eighth Day of June 1977

[SEAL]

Attest:

RUTH C. MASON
*Attesting Officer*

C. MARSHALL DANN
*Commissioner of Patents and Trademarks*